United States Patent [19]

Emura et al.

[11] 4,402,901
[45] Sep. 6, 1983

[54] METHOD OF PRESS FORMING OF PLASTIC MATERIAL

[75] Inventors: Koji Emura; Tuneo Suzaki; Koji Takai; Hidemichi Kazama, all of Fuji, Japan

[73] Assignee: Yamakawa Industrial Co., Ltd., Shizuoka, Japan

[21] Appl. No.: 250,300

[22] Filed: Apr. 2, 1981

[30] Foreign Application Priority Data

Apr. 16, 1980 [JP] Japan .................................. 55-50052

[51] Int. Cl.³ ............................ B29B 3/02; B29B 5/06
[52] U.S. Cl. .................................... 264/294; 264/319; 264/331.11
[58] Field of Search .................. 264/294, 319, 331.11; 428/258

[56] References Cited

U.S. PATENT DOCUMENTS

| | | | |
|---|---|---|---|
| 3,434,821 | 3/1969 | Wiley | 264/319 |
| 3,670,066 | 6/1972 | Valyi | 264/328.7 |
| 3,736,201 | 5/1973 | Teraoka | 264/294 |
| 3,822,794 | 7/1974 | Fougea | 425/258 |
| 4,089,926 | 5/1978 | Taylor | 264/294 |

Primary Examiner—Donald E. Czaja
Assistant Examiner—W. Thompson
Attorney, Agent, or Firm—Wenderoth, Lind & Ponack

[57] ABSTRACT

A method of press forming plastic material by a press having upper and lower moulds, in which melt plastic material is extruded from an extruder and is supplied to a metering chamber. The metering chamber supplies a metered amount of material into a movable arm which moves over the mould surface area of the lower mould and injects the material from an injection port of the arm, while the arm is moving. By suitably controlling the movement of the arm and material supply from the metering chamber, a desired charge pattern formed by a parapet shaped injected material can be formed. Automatic programming by a microprocessing unit is also easy.

1 Claim, 4 Drawing Figures

METHOD OF PRESS FORMING OF PLASTIC MATERIAL

BACKGROUND OF THE INVENTION

The present invention relates to a method of press forming of plastic material, and more particularly aims to provide a method of press forming of melt plastic material in which a series of forming operations from material charge to press forming are performed automatically.

Conventionally, press forming of plastic material by a press having open type moulds has been limited to a relatively narrow field, e.g. relatively large formed member which is unsuitable for injection moulding and formed member including long glass fibers which are difficult to form by injection moulding. Usually moderate size members of polypropylene or polyethylene are not formed by open type moulds. Starting material for the open type mould is usually supplied as a plastic sheet from a material supplier. When the sheet is made of stampable thermoplastic material, the sheet is softened by heating and is charged by personnel on a lower mould of the open type press. Such handling of each sheet is the most popular process in an open type mould press. However, plastic sheets are very expensive and reheating of the sheet necessitates much electric power. Further, workability and productivity can not be improved, and safety problems are inherent to the operation.

The conventional handling of the reheated sheet also involves problems that accurate positioning of the sheet is difficult so that non-uniform thickness or shortage tends to occur in the product, and that as the cured plastic sheet is reheated melt patches tend to occur on the surface. To avoid uneven heating the sheet is heated to relatively high temperature to result in surface overheat which tends to deteriorate material properties.

SUMMARY OF THE INVENTION

The object of the present invention is to eliminate the above mentioned disadvantages and to provide a novel method of press forming of plastic material by means of a press having open type moulds in which no plastic sheet is used, no handling charge is necessary and melt plastic material of desired fluidity is used as starting material.

According to of the present invention, a method of press forming plastic material by a press having an upper mould and a lower mould comprises steps of: supplying melt plastic material extruded from a melt plastic material supply source into a plastic material introducing movable arm, moving said movable arm over the mould surface area of the lower mould of a press, injecting the supplied plastic material from an injection port of said movable arm directly on the lower mould while the arm is moving, and displacing the movable arm from said mould surface area to allow press forming of the injected plastic material.

More specifically in accordance with the present invention, the method of press forming of plastic material by a press having an upper mould and a lower mould comprises steps of: (1) accumulating melt plastic material extruded from a melt plastic supply source in a metering chamber, (2) supplying metered quantity of accumulated melt plastic material from said metering chamber into a plastic material introducing movable arm, (3) moving said movable arm at least one dimensionally over the mould surface area of the lower mould of a press cooperating with said supply of plastic material, (4) injecting the metered supply of plastic material from an injection port of said movable arm directly on the lower mould while the arm is moving, (5) dispensing plastic material from the injection port to form a predetermined continuous or discontinuous charge pattern on the lower mould by repeating the moving step (3) and injecting step (4) at each supplying step (2), (6) displacing the movable arm from said mould surface area after the desired charge pattern is formed, and (7) press forming the plastic material on the lower mould.

Preferably, the moving step of the movable arm is controlled as to moving position, moving speed, moving distance and moving direction corresponding to the desired charge pattern.

Preferably, the dispensing step of plastic material is performed to form at least one parapet shaped or pillow shaped plastic material to form the predetermined charge pattern.

Thus, according to the present invention, the necessary quantity of melt plastic material is supplied in a short period of time directly on the lower mould in a predetermined charge pattern. Consequently, production of a plastic sheet, reheating of the sheet, and handling of the sheet are entirely eliminated. No personnel is necessary to charge the melt plastic material so that electric power consumption, working efficiency and productivity are substantially improved. Also, positioning accuracy, and non uniformity are improved, and overheat and deterioration of the plastic sheet are also eliminated.

Further, the method according to the invention allows selection of plastic material from a wide range of melt indexes, so that the applicable range is widened to conventional vacuum forming and injection moulding fields. In injection moulding, a large size product is unsuitable because melt plastic material injected from a small nozzle can not be supplied sufficiently far enough through sprues and runners. In the present invention, the charge range of melt plastic material can be set as desired by movement of the movable arm so that a large size product can be easily press formed. As no material remains in sprues and runners, yield rate is also improved. Further, plastic material used is not limited to high melt index material, as in the case of injection moulding, and also, high viscosity material that can not be used in injection moulding can be easily used in the present invention. Further, desired filler materials and long fibres can be mixed with the plastic melt. Also, the press forming cycle can be shorter than injection moulding so that productivity can be improved.

As described, the method according to the pesent invention allows use of a plastic material of high fluidity which has been difficult to use in conventional press forming by open type press, and as freedom of selection of plastic material is increased, products of high properties in compression strength, tensile strength and impact strength can be easily produced. In the conventional injection moulding utilizing plastic material of high fluidity, plastic material must be injected into enclosed moulds from fixed points, so that distribution of material is not sufficient, weld lines by butting of material tend to occur, and properties of the product tend to deteriorate. In the present invention a wide range of plastic material can be used as necessary, and plastic material is charged in parapet shaped form or pillow shaped corresponding to a predetermined charge pattern so that distribution in the mould while pressing is improved, movement of material is simple, and tendency to produce weld lines is greatly decreased. The distribution quantity and rate of the parapet shaped or pillow shaped material are determined by selection of each charge of material from the metering chamber, and each moving speed of the plastic material introducing movable arm in each predetermined range. Thus, the quantity of charged material at each charge is determined as necessary, uniformity of thickness is improved, thickened portions can be filled properly, and no shortage occurs.

The invention will be described in more detail hereinafter with reference to the accompanying drawings which are given solely by way of example and in which:

DESCRIPTION OF PREFERRED EMBODIMENT

Figure 1:
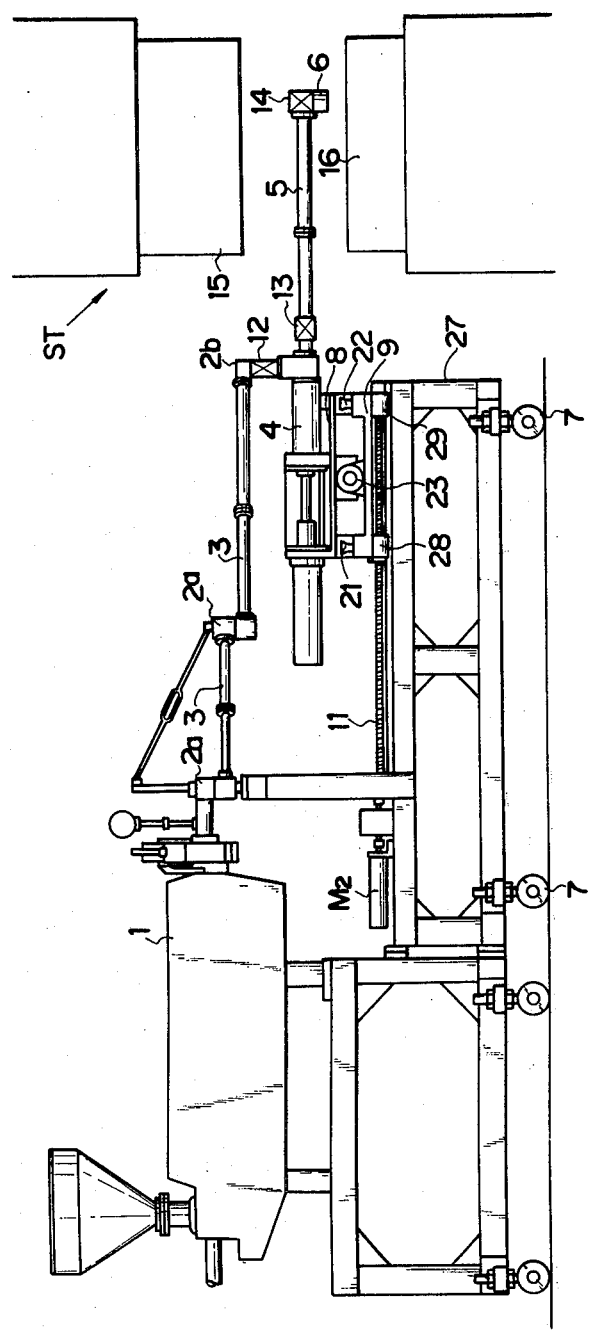
FIG. 1 is a schematic side elevation of an apparatus of carry out the method according to the present invention.
Figure 2:
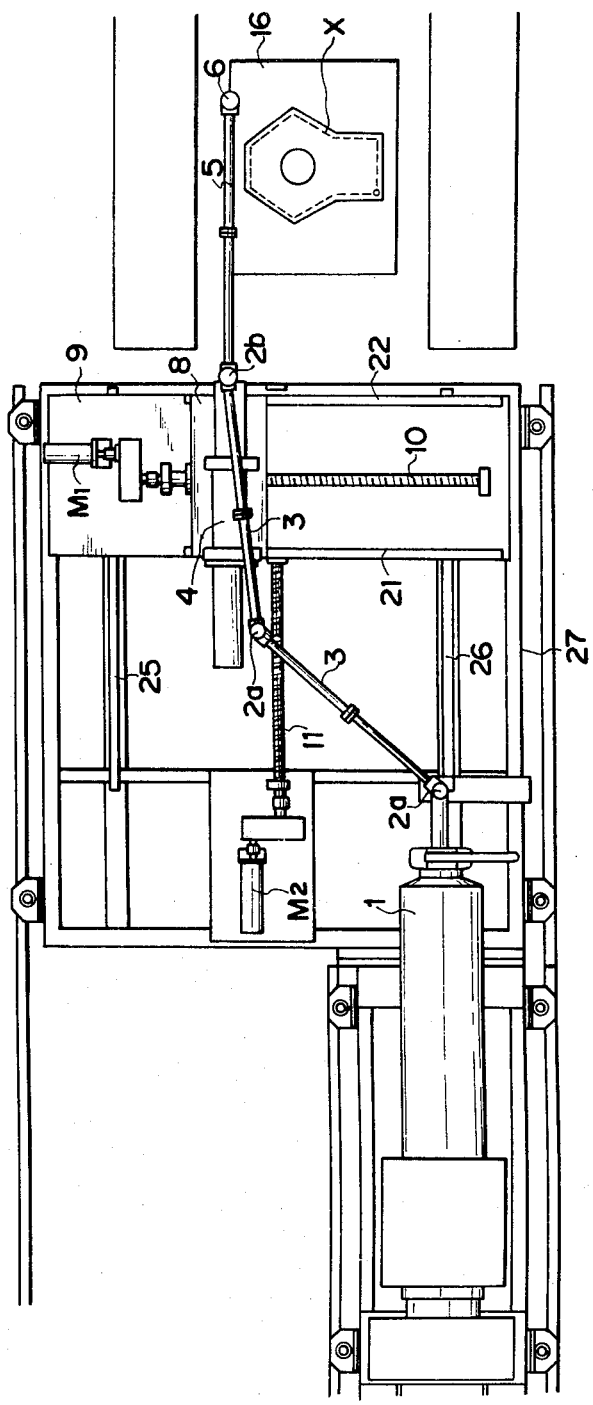
FIG. 2 is a plan view of FIG. 1.

Referring to FIGS. 1 and 2, 1 designates an extruder which acts as melt plastic material supply source. The melt plastic material is extruded forward by e.g. screw means in the extruder. On the front end of the extruder 1 universal swing arms 3 are mounted through universal joint means 2a and 2b. Plastic material is supplied into the hollow swing arm 3. The front end of the foremost arm 3 communicates with an accumulator cylinder 4 through a check valve 12. Melt plastic material extruded from the extruder 1 is accumulated in the accumulator cylinder 4 which acts as metering chamber. On the front end of the accumulator cylinder 4 a movable arm 5 which acts as plastic material introducing conduit is mounted through a stop valve 13. On the front end of the arm 5, an injection port 6 is mounted through a stop valve 14. The arm 5 is extended to a press forming machine ST such that the injection port 6 is on the necessary portion of a lower mould 16.

Melt plastic material accumulated in the accumulator cylinder 4 is supplied by forward motion of a piston in the cylinder 4. The valve 12 is closed and the valves 13 and 14 are opened. The quantity which is supplied into the movable arm 5 is determined by setting the stroke of the piston. The metered plastic material is injected on the lower mould 16 through the port 6.

Figure 4:
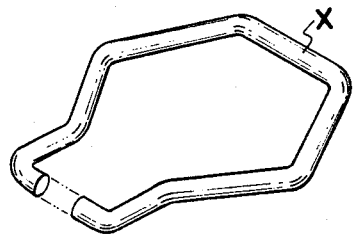
FIG. 4 is a perspective view of the charge pattern formed according to FIG. 3.

The supply of the metered melt plastic material from the accumulator cylinder 4 is repeated after the plastic material is supplied from the extruder 1. Thus, the port 6 injects the metered material on the necessary portion on the lower mould 16. The movable arm 5 can be retracted or displaced laterally when an upper mould 15 of the machine is moved downwards to perform press forming. Further, the arm 5 can be moved simultaneously with the metered supply of the plastic material so that a desired charge pattern can be formed on the lower mould 16. The arm 5 may be moved linearly in a direction parallel with the axis of the arm 5, or laterally to form a generally linear pattern. On the arm 5 may be moved two dimensionally to form a two dimensional charge pattern such as shown in FIG. 4. The charge pattern is not necessarily a continuous form and can be formed by a series of spaced charges.

The apparatus shown in FIGS. 1 and 2 includes means to move the movable arm 5 and the port 6 in two dimensions to form a one or two dimensional charge pattern. In the embodiment shown, the arm 5 is secured with the front end of the accumulator cylinder 4 which is supported on a first carriage 8. The first carriage 8 is slidably supported on guide members 21 and 22 which are secured with a second carriage 9. A bracket 23 having inside threads is mounted under the first carriage 8 and engages a first lead screw 10 which is supported on the second carriage 9. A servomotor $M_1$ supported on the second carriage 9 is drivably connected with the lead screw 10.

The second carriage 9 is slidably supported on guide members 25 and 26 which are mounted on a frame 27. Brackets 28 and 29 having inside threads are mounted under the second carriage 9 and engage a second lead screw 11 which extends perpendicular to the axis of the first lead screw $a^0$. A servomotor $M_2$ supported on the frame 27 is drivably connected with the second lead screw 11. The frame 27 may be secured on a base beside the press ST, or may be transported on support rollers 7 to a desired place and locked to the base by suitable means not shown.

Figure 3:
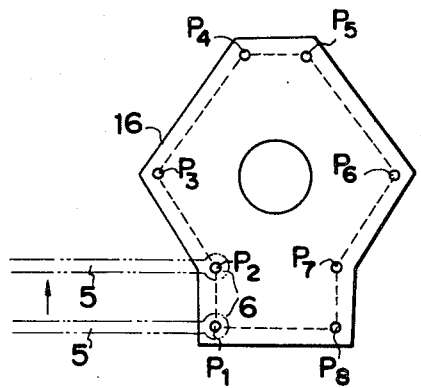
FIG. 3 is a plan view to illustrate the process of forming a charge pattern on the lower mould of the press machine shown in FIGS. 1 and 2.

In operation, at first, the servo motors $M_1$ and $M_2$ are operated to move the arm 5 to align the port 6 to a reference point on the lower mould 16, e.g. point $P_1$ shown in FIG. 3. When the motor $M_1$ is driven in one direction, the lead screw 10 is rotated to move the bracket 23 and the first carriage 8 upwards or downwards as viewed in FIG. 2 so that the accumulator cylinder 4, arm 5 and port 6 move correspondingly. The linkage formed by the universal joints 2a and 2b and the hollow arms 3 which connect the stationary extruder 1 and the accumulator cylinder 4 allow such movement. When the servomotor $M_2$ is driven in one direction, the lead screw 11 rotates to move the brackets 28 and 29 and the second carriage 9 leftwards or as viewed in FIGS. 1 and 2. Thus, the first carriage 8, accumulator cylinder 4, arm 5 and the port 6 move to leftwards or rightwards. The linkage between the extruder 1 and the accumulator cylinder 4 also allows such movement.

By controlling the operations of the servomotors $M_1$ and $M_2$ in predetermined relation, the first and second carriages 8 and 9 move on an X axis and Y axis of predermined speeds. The resultant movement of the arm 5 and the port 6 is such that the distance, speed and direction of the port 6 on the lower mould 16 are determined. By combining the movement of the port 6 with the operations of the extruder 1 and the piston of the accumulator cylinder 4, a continuous or discontinuous charge pattern can be injected on the lower mould 16.

FIG. 3 shows one example of charge patterns which can be formed by the apparatus shown in FIGS. 1 and 2. The port 6 is placed on the reference point $P_1$ at first, and moves along the dotted line to points $P_2$ to $P_8$. The port 6 moves from the point $P_1$ to point $P_2$ while only the motor $M_1$ is operating and the accumulator cylinder 4 is operated to inject melt plastic material from the port 6 at a predetermined rate. Then the motor $M_1$ is stopped and the accumulator cylinder 4 is charged by the extruder 1. Next, both the motors $M_1$ and $M_2$ are operated in predetermined relation and the accumulator cylinder 4 injects the material at predetermined rate while port 6 moves along the dotted line from $P_2$ to $P_3$. The process is continued to form a parapet shaped charge pattern shown in FIG. 4. Then the arm 5 is retracted or moved sideways and the upper mould 15 is lowered to press the desired part.

The charge pattern shown in FIG. 4 is continuous and of rather uniform cross section area along the length. However, it will be clear that the charge pattern may be formed by discontinuous parapets or a series of pillows of similar or different cross sectional areas.

In the embodiment shown in FIGS. 1 and 2, the arm 5 can be moved in two dimensions. By adding elevating mechanism the arm 5 can be moved in three dimensions. Such apparatus can be efficiently used when the mould surface includes an evident heights difference or the height of different moulds are different from each other.

The operations of the apparatus, e.g. extrusion of melt plastic material from the extruder 1, supply of the material from the accumulator cylinder 4, opens and closing of the valves 13 and 14, operations of the servomotors $M_1$ and $M_2$ and press operation of the upper mould 15 can be controlled by utilizing a conventional microcomputer having a suitable program device. Thus, charging of plastic material and press forming thereof can be automatically performed.

It will be appreciated that, according to the present invention, in press forming by open type moulds, melt plastic material, a wide range of from high fluidity to low fluidity, can be directly and automatically charged on the lower mould. This is the feature which is utilized for the first time by the present invention. Also the charging of the melt plastic material, according to the present invention, is performed by dispensing the material in a predetermined charge pattern on the lower mould, and this feature is also utterly different from conventional charging of plastic material.

By the direct automatic charging process in the press forming field, according to the present invention, many problems in conventional handling of a charge in press forming are eliminated. Also, the press forming can be used in lieu of conventional injection moulding and some limiting conditions in injection moulding can be eliminated.

The apparatus, according to the present invention, is substantially cheaper than a conventional injection moulding machine, and many kinds of plastics can be formed. Also, a wide range of sizes and thicknesses of the formed parts can be manufactured easily.

What is claimed is:

1. A method of press forming a plastic material by means of a press having an upper mould and a lower mould, which comprises the steps of:
   (a) extruding a plastic melt from an extruder into a first movable hollow arm which communicates with said extruder,
   (b) introducing said plastic melt from said first arm into a metering chamber which comprises an accumulator cylinder and which communicates with said first arm, to accumulate said plastic melt in said metering chamber,
   (c) extruding and supplying a predetermined metered amount of the accumulated plastic melt from said metering chamber into a second movable hollow arm provided with an outlet and which communicates with said metering chamber,
   (d) repeating the steps (b) and (c),
   (e) moving said first and second arms in at least two dimensions, the movement of said first and second arms cooperating with the step (c) to move said outlet of said second arm to a plurality of positions over the surface of said lower mould in accordance with a predetermined charge pattern corresponding to a desired article to be press formed, the step (e) being conducted intermittently each time the step (c) is conducted so as to successively move said outlet of said second arm from one position to another over the surface of said lower mould,
   (f) injecting said predetermined metered amount of said accumulated plastic melt from said outlet of said second arm directly onto said lower mould while continuing the movement of said outlet of said second arm, the step (f) being conducted each time said outlet of said second arm is moved from one position to another over the surface of said lower mould, the step (e) and the step (f) cooperating to dispense said plastic melt onto said lower mould to continue said plastic melt between the respective adjacent positions of said plurality of positions into a parapet or pillow shape, thereby forming as a whole said charge pattern of said plastic melt corresponding to said desired article to be press formed, the movement of said first and second arms for moving said outlet of said second arm being controlled in accordance with data of said desired charge pattern programmed in advance by a microcomputer, the control of the moving position, direction and distance of said second arm by said programmed data thereby setting respective distances between said plurality of positions of said outlet of said second arm, the control of both the moving speed of said second arm by said programmed data and the amount of said plastic melt in the step (c) setting a dispensing amount and a dispensing rate for said plastic melt injected over said respective distances, thereby forming said desired charge pattern of said plastic melt on said lower mould in accordance with said set dispensing amount and rate,
   (g) moving said second arm, upon completion of the formation of said charge pattern, so as to move said outlet of said second arm away from the surface area of said lower mould to permit press forming said plastic melt in said desired charge pattern, and
   (h) closing said upper and lower moulds together to press form said plastic material.

* * * * *